United States Patent [19]

Farnham

[11] 4,397,434
[45] Aug. 9, 1983

[54] SURVIVABLE SATELLITE BUS STRUCTURAL FRAME

[75] Inventor: Charles J. Farnham, Bellevue, Wash.

[73] Assignee: The United States of America as represented by the Secretary of the Air Force, Washington, D.C.

[21] Appl. No.: 342,995

[22] Filed: Jan. 27, 1982

Related U.S. Application Data

[63] Continuation of Ser. No. 126,272, Mar. 3, 1980, abandoned.

[51] Int. Cl.³ ............................ B64G 1/50; B32B 3/12
[52] U.S. Cl. .................................. 244/158 R; 428/116
[58] Field of Search .................. 244/158 R, 161, 159, 244/171; 428/116

[56] References Cited

U.S. PATENT DOCUMENTS

| | | | |
|---|---|---|---|
| 4,016,022 | 4/1977 | Browning et al. | 428/116 |
| 4,136,846 | 1/1979 | Brault | 428/116 |
| 4,259,821 | 4/1981 | Bush | 244/158 R |

Primary Examiner—Trygve M. Blix
Assistant Examiner—C. T. Bartz
Attorney, Agent, or Firm—Donald J. Singer; Jacob N. Erlich

[57] ABSTRACT

A three-sided prism shaped structure including upper and lower graphite/epoxy honeycomb sandwich decks spaced by rectangular graphite/epoxy longerons and braces, all of which are attached by using machined aluminum fittings. A graphite/epoxy sandwich panel and cone assembly is bonded to one side of the structure for mounting a space sextant therein. Aluminum equipment panels are attached to the other two sides. The bus structure is manufactured in accordance with available procedures for fabricating graphite/epoxy composite material which is the primary structural material.

1 Claim, 1 Drawing Figure

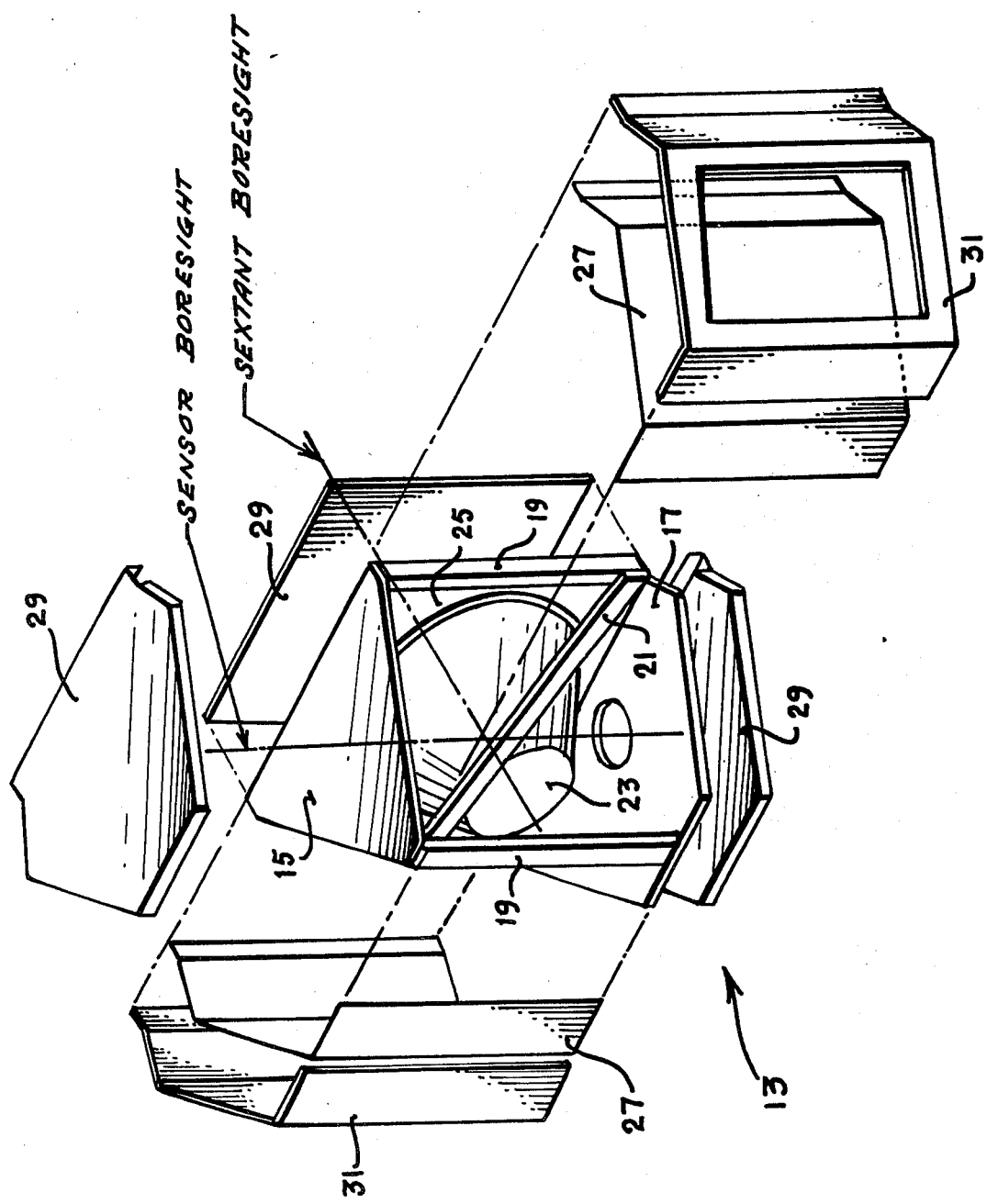

SURVIVABLE SATELLITE BUS STRUCTURAL FRAME

STATEMENT OF GOVERNMENT INTEREST

The invention described herein may be manufactured and used by or for the Government for governmental purposes without the payment of any royalty thereon.

This is a continuation of application Ser. No. 126,272, filed Mar. 3, 1980, now abandoned.

BACKGROUND OF THE INVENTION

This invention relates to the fabrication of a bus module for use on a missile for possible launch into earth orbit and, more particularly, the invention is concerned with providing a graphite/epoxy satellite module structure for use in a survivable launch system capable of carrying a variety of payloads such as communication systems.

General design considerations for fabricating a satellite bus module in support of a survivable launch program are the provision of a thermally stable structure capable of carrying a variety of payloads such as communication systems. The module must be dimensionally stable in order to achieve navigation and pointing accuracies required in performing the intended missions. This necessitates a design which utilizes a graphite/epoxy composite as the primary structural material used in the fabrication of the module. The module with the payload installed therein, is attached to a missile for launch into earth orbit.

SUMMARY OF THE INVENTION

The invention is concerned with providing a composite bus module structure for carrying a variety of payloads including communication systems. The basic module configuration is a three-sided, prism shaped structure having upper and lower graphite/epoxy honeycomb sandwich decks spaced by graphite/epoxy longerons and braces which are attached by means of aluminum fittings. A graphite/epoxy sandwich panel and cone assembly is bonded to one side of the module for mounting a space sextant. Aluminum equipment panels are attached to the other two sides. The bus module structure is manufactured in accordance with standard procedures for graphite/epoxy composite material.

An opject of the invention is to provide a graphite/epoxy bus module structure which is thermally stable in order to achieve navigation and pointing accuracies required in performing the intended mission.

Another object of the invention is to provide a graphite/epoxy bus module in the form of a three-sided, prism shaped structure having upper and lower honeycomb sandwich decks spaced by rectangular longerons and braces.

A further object of the invention is to provide a satellite bus module which includes a graphite/epoxy sandwich panel and cone assembly bonded to one side of the module for mounting a space sextant therein.

A still further object of the invention is to provide a prism shaped bus module structure wherein the longerons and braces positioned between the sandwich decks are fabricated from 12 plies of unidirectional graphite/epoxy prepreg in a balanced cross ply orientation.

These and other objects, features and advantages will become more apparent after considering the following detailed description taken in conjunction with the annexed drawing and appended claims.

BRIEF DESCRIPTION OF THE DRAWING

The drawing FIGURE is an exploded view of a bus module according to the invention showing the longerons and braces along with the cone assembly and sandwich decks.

DESCRIPTION OF A PREFERRED EMBODIMENT

Referring now to the FIGURE, there is shown a bus module structure according to the invention including a prism-shaped structure 13 having an upper graphite/epoxy honeycomb sandwich deck 15 and a lower graphite/epoxy honeycomb sandwich deck 17. The decks 15 and 17 are substantially triangular in configuration and are separated from one another by three longerons 19, one each positioned vertically between corresponding corners of the decks 15 and 17. A pair of braces 21 (only one of which is shown) are located diagonally between the forward apex of the upper deck 15 and the base corners of the lower deck 17.

A cone 23 in the shape of a frustum is attached at its base to a cone mounting panel 25 which is positioned between the bases of the upper and lower decks 15 and 17. The upper deck 15, lower deck 17 and cone mounting panel 25 are all of sandwich construction with a graphite-reinforced epoxy composite laminate over an aluminum honeycomb core. A pair of equipment mounting panels 27 are positioned one on each side of the structure 13 for holding heaters along with other temperature testing equipment. The equipment mounting panels 27 serve to enclose the sides of the structure 13. A series of multi-layer insulating blankets 25 cover the outside of the structure 13 including the cone mounting panel 15, the upper deck 15 and the lower deck 17. Other insulating members 31 which are configured in the shape of the equipment mounting panels 27 serve to prevent the transfer of heat from the equipment panels 27.

The structural arrangement of the satellite bus structure 13 includes a one inch thick sandwich lower deck 17, three box-section longerons 19, two box-section shear braces 21, a sextant mounting cone 23, two equipment mounting assemblies 27, a shear web cone mounting panel 25 and a one-half inch thick sandwich upper deck 15. The shear braces 21 operate to stabilize the two sides of the structure 13 formed by the longerons 19 and the upper and lower decks 15 and 17, respectively. The third side of the structure 13 is stabilized by the cone mounting panel 25 which is a one inch thick sandwich structure that provides support for a space sextant (not shown) and other electronic equipment. The inboard end of the sextant is supported by the cone 23 which is a monocoque structure that extends from the inboard end of the sextant to the cone mounting panel 25. The upper deck 15 provides an attachment surface for various payload modules.

Unstiffened 0.060 inch thick aluminum sheets are used for equipment mounting panels 27. The interior surface of the equipment panels 27 is painted with a flat black paint. The interior surface of the cone mounting panel 25, as well as the truncated cone 23 to which the sextant mount, are covered with a single layer of aluminized Mylar to provide high reflectance. Thermal energy radiated from the equipment will be reflected to the equipment mounting panels 27 and reradiated externally.

The longerons 19 and shear braces 21 are fabricated from 12 plies of unidirectional 0.005 inch thick graphite/epoxy material in a balanced layup orientation. Layup and cure is accomplished on male aluminum tooling mandrels having surfaces polished to a high finish with a taper incorporated into the mandrel width and thickness dimensions to facilitate part removal after completing of the cure cycle. The as-received prepreg is first trimmed into 0° and ±47.5° gore patterns, using templates with the gore patterns being calculated to provide complete coverage of the mandrel surface when applied at the specified fiber angle. The gores are then prebled in an autoclave at 180° F. and 100 psi to specified resin content requirements. After completion of these operations, the gores are sequentially laid up on the mandrel surface until all 12 plies have been applied. A location template is used as a means of controlling accuracy in gore alignment, and thus fiber angle, relative to the 0° mandrel axis. After all of the plies are applied, a fiberglass caul plate is positioned against the outer ply and the entire assembly is vacuum bagged against the mandrel surface in preparation for cure. Final cure is accomplished in an autoclave, using a step cycle to 350° F. and 100 psi.

The cone 23 is fabricated from two plies of 0.013 inch thick graphite/epoxy fabric material in a balanced 0° layup orientation with layup and cure being accomplished on a male aluminum tooling mandrel. The as-received prepreg is first trimmed into diamond-shaped gore patterns with the specified fabric warp orientation and calculated so that 16 elements will provide complete coverage of the mandrel surface. The gores are sequentially laid up on the mandrel surface in such a manner that the centerline of each gore coincides with the radial direction of the mandrel contour. Adjacent gores in each ply are butt joined and a female alignment template indexed to the center of the mandrel and matched to its external contour is used as an aid in achieving proper alignment. After all 16 gores are positioned, the completed ply is vacuum debulked. First and second plies are laid up using identical procedures, although gore-to-gore splices between plies are staggered at 22.5°. After completion of the layup, perforated Teflon separator film, fiberglass cloth glass bleeder, and a split fiberglass caul plate are carefully positioned against the layup and the entire assembly is vacuum bagged in preparation for cure. Final cure is accomplished in an autoclave, using a step cycle to 350° F. and 100 psi.

Final assembly and bonding of the structure 13 is accomplished in several steps, using room temperature curing adhesive. To maintain structural alignment during assembly, a tooling fixture consisting basically of a surface table and two opposing angle plates is used. This fixture serves to align and space the upper and lower deck panels 15 and 17, respectively, in correct relationship to one another during installation of the longerons 19 and cone panel 25. In sequence, all details and subassemblies are assembled and aligned using the tooling fixture. The two adjacent longerons 19 are then bonded to the cone panel 25 with suitable longeron clips (not shown). Concurrently, the shear braces 21 are bonded across attachment lugs on the longeron fittings. Once this operation is completed, the upper and lower decks 15 and 17, respectively, are bonded to the ends of the longeron fittings. To complete the assembly, the upper and lower decks 15 and 17, respectively, are bonded to the cone support panel 25 with appropriate clips and the equipment mounting panels 27 are installed.

Although the invention has been illustrated in the accompanying drawing and described in the foregoing specification in terms of a preferred embodiment thereof, the invention is not limited to this embodiment. It will be apparent to those skilled in the art that the hereinbefore described composite bus module structure can maintain the angular relationship between the space sextant axis and the payload sensor axis within ±80 arc-sec in orbit and probably will maintain the axes within ±30 arc-sec. Also, it should be noted that certain changes, modifications and substitutions can be made in the construction details without departing from the time spirit and scope of the appended claims.

Having thus set forth the nature of my invention, what I claim and desire to secure by Letters Patent of the United States is:

1. A composite bus module structure for carrying a payload including a space sextant and payload sensor into earth orbit by a missile, said structure being resistant to heat transfer and thereby comprising:

an upper deck and a lower deck in parallel relationship thereto and spaced therefrom, said decks being of substantially triangular configuration, each deck having a base and a pair of sides, said decks having aluminum honeycomb cores, said cores covered by a graphite-reinforced epoxy composite laminate, said upper deck having the payload sensor mounted thereon;

three box-section longerons fixedly secured vertically between said upper and lower decks, said longerons fabricated from 12 piles of unidirectional 0.005 inch thick graphite/epoxy material in a balanced layup orientation;

a pair of box-section shear braces fixedly secured diagonally between the apex of said upper deck and said base of said lower deck, said braces fabricated from 12 piles of unidirectional 0.005 inch thick graphite-epoxymaterial in a balanced layup orientation;

a cone mounting panel, fixedly secured vertically between said bases of said decks, said cone mounting panel having an aluminum honeycomb core, said panel core covered by a graphite-reinforced epoxy composite laminate;

a cone in the form of a frustum fixedly secured at a base to said cone mounting panel and extending inwardly, said cone fabricated from two piles of 0.013 inch thick graphite/epoxy fabric material in a balanced 0° layup orientation, said space sextant mounted within said cone;

a plurality of equipment mounting panels positioned vertically between adjacent sides of said triangular upper and lower decks for holding the payload, said panels fabricated from aluminum sheets; and insulating means fixedly secured to said upper and lower decks, said cone mounting panel, and said equipment mounting panels for preventing heat transfer therethrough;

wherein said bus module structure maintains axes of said space sextant and payload sensor within approximately eighty arc-seconds deviation of each other.

* * * * *